2,159,046

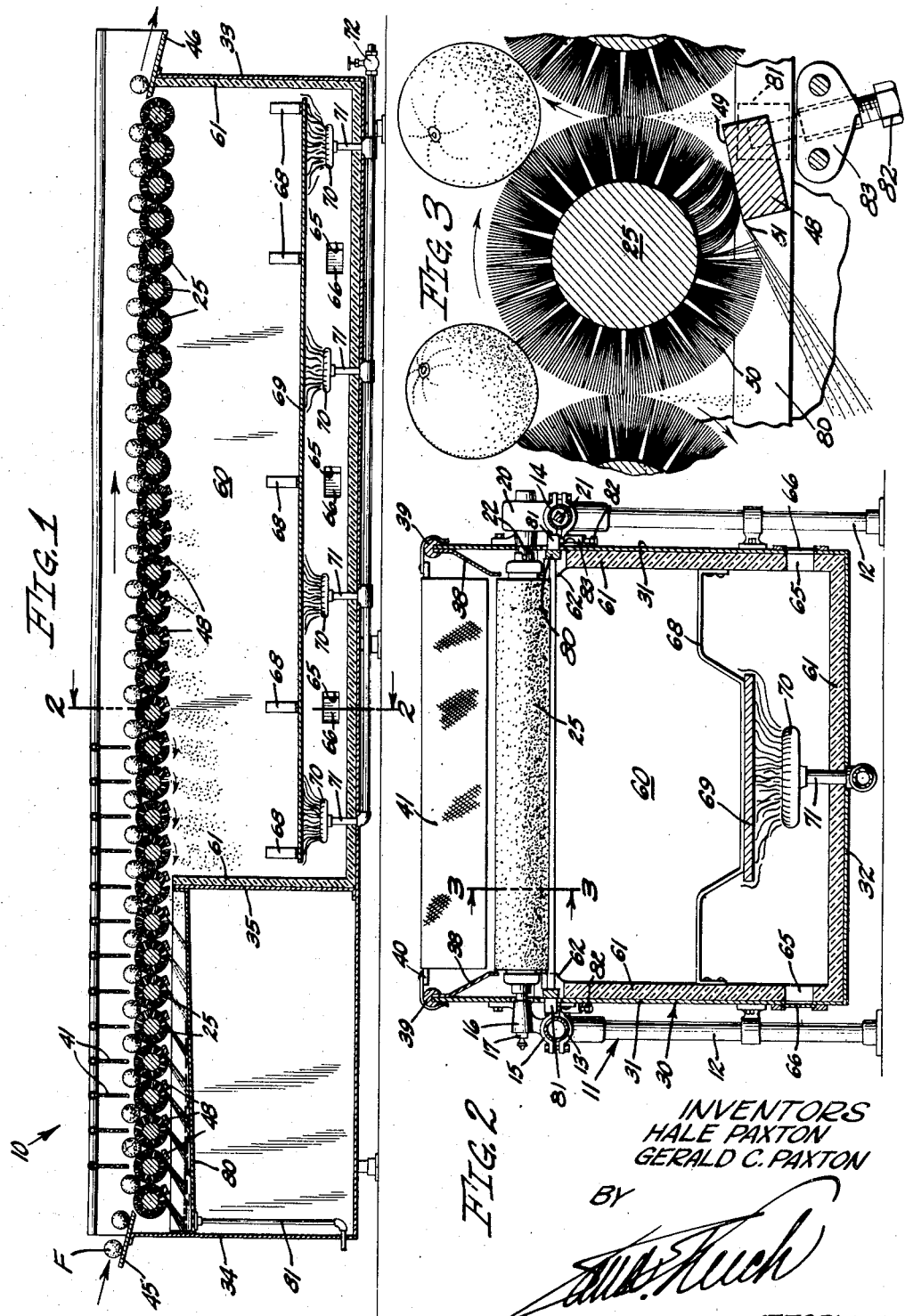
May 23, 1939.  H. PAXTON ET AL  2,159,046
METHOD OF AND APPARATUS FOR REMOVING FREE WATER ADHERING
TO THE OUTER SURFACES OF WHOLE FRESH FRUIT
Filed Jan. 28, 1936
INVENTORS
HALE PAXTON
GERALD C. PAXTON
BY
ATTORNEY Patented May 23, 1939

UNITED STATES PATENT OFFICE 2,159,046

METHOD OF AND APPARATUS FOR REMOVING FREE WATER ADHERING TO THE OUTER SURFACES OF WHOLE FRESH FRUIT

Hale Paxton and Gerald C. Paxton, Santa Ana, Calif., assignors, by mesne assignments, to Food Machinery Corporation, a corporation of Delaware Application January 28, 1936, Serial No. 61,182

10 Claims. (Cl. 34—24)

This invention relates to the art of preparing fresh, whole fruit commercially for market and has particular utility in removing free water adhering to the outer surfaces of such fruit after the latter has been washed and prior to its being packed for shipment.

While capable of handling any of a large number of varieties of fruit, the invention is especially adapted for the handling of citrus fruits, and it will accordingly be described as used in the drying of oranges.

For several decades the practice in commercially preparing oranges for market in the United States has been to pass these successively through a washer, a water eliminator, a drier, a polisher, a surface characteristic sorting table, and a sizer before the fruit is wrapped by hand and placed in shipping cases. In the last few years, brass roll water eliminators have been largely used, but these are not only expensive to install and maintain but they are very noisy in operation owing to the screeching of rubber squeegees on the brass rolls used therein.

It is an object of our invention to provide a method of and appartus for removing free water adhering to the outer surfaces of fresh, whole fruit which will avoid the necessity for a special water eliminator being employed between the orange washer and drier, thereby doing away with the cost of installing and operating such an eliminator, as well as the noise attendant upon its operation.

The orange driers at present in general use include fans for blowing large volumes of air at a relatively high rate of delivery against the fruit as this passes through a drying chamber. These fans are noisy in operation and create a very considerable draft in the packing house where the machinery is installed, which tends to create an unfavorable working condition for the packers who generally occupy the same room.

It is another object of our invention to provide a method of and apparatus for removing free water adhering to the outer surfaces of fresh, whole fruit which method and apparatus is free from the noise and draft attendant upon the use of fans.

A further object of our invention is to provide a novel drier for fresh, whole fruit which has an efficiency equal to or greater than that of driers now in use and which is substantially less expensive to manufacture and to operate.

The manner of accomplishing the foregoing objects as well as further objects of the invention will be made manifest in the following description taken in connection with the accompanying drawing, in which:

Fig. 1 is a longitudinal vertical sectional view taken through a preferred embodiment of the apparatus of the invention;

Fig. 2 is an enlarged transverse sectional view taken on line 2—2 of Fig. 1;

Fig. 3 is an enlarged sectional view taken on the line 3—3 of Fig. 2, and illustrating in detail the mode of removing water from the brushes.

Specific reference will now be made to the drawings which illustrate a preferred embodiment 10 of the fruit drying apparatus of our invention.

The drier 10 includes a frame 11 having legs 12 on the upper ends of which are carried longitudinal pipes 13 and 14. The pipe 13 carries brackets 15 which are clamped thereon, as shown in Fig. 2 and which provide a series of standards 16 in which are slidably mounted idle stub shafts 17.

Clamped in place upon the longitudinal frame pipe 14 is a series of housings 20, enclosing gear mechanisms, which operably connect a drive shaft 21, which is journaled in suitable bearings provided in the pipe 14, and brush drive shafts 22, which are journaled in the housing 20. Each of the shafts 22 is in alignment with one of the idle shafts 17. Rotatably supported at its opposite ends by each aligned pair of the shafts 17 and 22 and driven by the latter is one of a series of cylindrical brushes 25. While these brushes may have various surface configurations, it is preferable that their outer surfaces always be substantially cylindrical in shape, or at least comprise surfaces of rotation. While these brushes need not necessarily contact, it is also preferable that they do so, as shown in Fig. 3.

Supported on frame 11 is a drier shell 30 having sidewalls 31, a bottom 32, end walls 33 and 34, and a partition 35. The sidewalls 31 extend upwardly above the brushes 25 and are provided with aprons 38 and rails 39. Supported at their opposite ends on the rails 39 are curtain bars 40, each of which has a curtain 41 suspended therefrom, as shown in Fig. 1. The curtains 41 are preferably disposed in close spaced relation over the left hand or receiving end of the drier 10.

The end wall 34 of the shell 30 has a drop board 45 from which fruit is fed into the left hand end of the apparatus. End wall 33 has a dropboard 46 from which fruit is delivered from the apparatus at the right hand end thereof. Supported at their ends on the side walls 31 of the drier shell 30 is a series of bars 48, each of which is positioned so that a flat face 49 thereof extends gradually, at a relatively small angle, into the path of the extremities of bristles 15 of one of the brushes 25. The edge 51 of the face 49 is straight and makes an abrupt break at a right angle from the base 49. It is preferable that substantially one-half or more of the brushes 25 be equipped with bars 48, the reason for this being made clear hereinafter.

Sidewalls 31, floor 32, end wall 33 and partition 35 unite to form a drying oven 60 which is provided with asbestos or some other heat insulating lining 61. Upper end portions 62 of the insulating material 61 extend into close proximity with the ends of the brushes 25 to substantially prevent dissemination of hot air from the oven 60 excepting into or between the brushes 25. Extending through the sidewalls 31 and the insulation 61 provided thereon are ventilation ports 65 controlled by gates 66. These are shown as manually operated but may be automatically operated by an electric temperature regulating thermometer located in the oven 60 if this is desired. Supported by straps 68 extending between the walls 31, is an oven plate 69 which is adapted to be heated by gas burners 70 mounted on gas pipes 71 which extend upwardly through the floor 32 from a gas supply pipe 72.

In the space between the end wall 34 and the partition 35 is mounted a drain pan 80 which connects with a drain pipe 81 leading to the sewer.

Operation

The apparatus 10 is preferably operated in the following manner to carry out the method of our invention. The drive shaft 21 is rotated so as to rotate all of the brushes 25 in the same direction and at the same rate, this being preferably between 150 and 250 revolutions per minute. At the present time it is customary to run these brushes at 210 R. P. M. Gas is now supplied through the pipe 72 to the burners 70 and this is ignited so as to heat up the plate 69 and thus raise the temperature of the air in the oven 60 to a temperature of somewhere between 100° F. and 160° F. The gates or shutters 66 are adjusted so as to admit only a relatively small amount of air to the lower portion of the oven 60. The result of this is that the heat from the burners 70 is practically all transferred to the brushes 25, heating up the bristles of these brushes to practically the temperature of the air in the oven.

Fruit is now fed into the machine over the drop-board 45, as shown in Fig. 1. As this fruit fills up the valley between the first pair of brushes 25, other fruit fed into this valley over drop-board 45 pushes that already there over into the next valley and this process is repeated until a continuous stream of fruit is flowing through the machine and out at the right hand end thereof.

The best results are obtained when the apparatus 10 receives fruit from a combined washer and drier, such as shown in the copending application of Hale Paxton, Ser. No. 391, filed January 4, 1935, in which a portion of the free water deposited on the fruit when it is washed and rinsed is removed from the fruit prior to the discharge of the fruit from the washer. Thus the fruit F entering the drying apparatus 10 carries considerably less than the maximum amount of water which can be made to adhere to the surface of the fruit.

As the stream of wet fruit entering the left end of the apparatus 10 continues, the fruit first filling the first valley is dislodged by the next incoming fruit and propelled over into the next valley, this process continuing to cause a practically continuous flow of fruit clear through the apparatus and out at the right hand end thereof.

As the fruit rests, momentarily at least, in each of the valleys, it is rotated by the brushes forming this valley and the rolling and brushing contact between these brushes and this fruit transfers onto the brushes a portion of the free water carried by the surfaces of this fruit. The amount of water actually thus transferred to the brushes forming any given valley depends to a considerable extent upon how much water was carried by the surfaces of the fruit when the latter arrived in that valley. As the fruit gives up some of its free water in each of the valleys through which it successively passes, it is therefore clear that the amount of water delivered to any particular one of the brushes 25 is inversely proportionate to the number of brushes the fruit has already rolled across before reaching this particular brush. The time of rolling contact between each brush and the fruit is also a factor in the absorption of water by the brushes from the fruit, but with a uniform flow of fruit through the apparatus, this factor cancels out of the equation as it is practically uniform for each brush in the apparatus.

Because of this progressive loss of water from the fruit to the brushes there is less and less water to be removed from each of the brushes as we go from the left end toward the right end of the apparatus.

It is necessary to continuously remove from each of these brushes at least as much water as is delivered to that brush from the fruit. Otherwise this brush would eventually get saturated and cease to remove water from the fruit resting thereon.

To effect this removal of water from the brushes 25 we have equipped a group consisting of over half of these brushes, (which group is located next to the fruit receiving end of the apparatus), with the bars 48. Surfaces 49 of these bars extend gradually into the rotational paths of the tips of the bristles of these brushes, as shown in Fig. 3, so as to restrain, retard, and flex these bristles and then at the height of such restraint, to release the bristles permitting the latter to flap back to their normal positions on the brushes. This sudden motion of the bristles greatly increases the centrifugal force to which the water particles on these bristles are subjected and causes a considerable portion of such particles to be thrown downwardly from the bristles.

The size of the particles of water thus thrown from a brush vary in direct proportion with the amount of water carried in the interstices between the bristles. Thus the particles thrown from each brush are smaller than those thrown from the brushes disposed next thereto and towards the inlet end of the machine.

In the normal operation of the apparatus 10 the particles thrown from a certain initial group of the brushes, here shown diagrammatically as ten in number, are of sufficient size to make their collection by gravity in a drain pan expeditious. As to the particles thrown from brushes subsequently travelled over by the fruit, these are disseminated into the atmosphere in accordance with the method of our invention.

That method involves the maintenance of a body of air at a relatively high temperature closely adjacent to the under surfaces of the brushes 25. This body of air serves several functions. One of these is to evaporate and disseminate into the atmosphere as vapor the fine mist of water particles flipped by the bars 48 from those brushes which are disposed to the right of the initial group of ten. Another is to provide heated air which is pressurably forced upwardly into the widened interstices temporarily caused between the bristles by the flexing of the latter. Another purpose of this air is to keep the bristles 50 at a relatively high temperature. The heat thus stored in the brushes is released in increased evaporation of the water received from the fruit and carried on the bristles. Moreover the method by which we apply this heat to the brushes results in the latter being heated clear in to the core of the brush. This greatly increases the evaporation taking place in the interstices of the brush and on top of that replaces the air contained in these interstices with relatively fresh heated air with each revolution of the brush.

While we have depended upon a thermo-static upward pressure of the hot air in the oven 60 for this purpose, our invention also contemplates a modified mode in which the hot air is pumped from the oven 60 and discharged in jets directly up into the spaces between the bristles 50 just to the left of the bars 48. Our invention also contemplates the use of a plurality of such bars and such jets under each brush where rapid drying with a decreased number of brushes is desirable.

While bars 48 may be provided for all of the brushes 25 we found that in the general practice this is unnecessary and that the last half of the brushes (those over the oven 60) may just as well be left free as shown in Fig. 1. It is also desired to point out that while the construction and mode of operation shown is preferable, certain of the features so shown may be eliminated without crippling the efficiency of the invention. For instance, the disposition of the brushes 25 so that the peripheries of the adjacent brushes slightly contact, is provided for the purpose of flipping water from the downward moving bristle ends, as shown in Fig. 3. This arrangement may be used separate from the bars 48 or the latter may be used without providing for the contact of the brushes with each other.

The curtains 41 serve the purpose of intercepting particles of water sprayed from the upper portions of the peripheries of the brushes 25 at the entrance end of the apparatus 10, and prevents this water being transferred towards the right onto brushes substantially drier than the ones from which the water originates. Where the drier is pretty well filled with fruit there is only a negligible tendency of water to spray in this manner. Therefore the curtains 41 are usually not called into play excepting when the drier is running less than full capacity.

The bars 48 are preferably supported on longitudinal bars 80 having lugs 81 which extend out through the walls 31 and receive smooth upper ends of jack screws 82, which are threaded at the lower ends and screw through suitable threaded apertures in brackets 83 the latter being mounted rigidly on the outer surfaces of the walls 31. This arrangement permits ready adjustment in the elevation of the bars 48 to secure the optimum conditions for the removal of water by bars 48 from the brushes 25.

What we claim is:

1. The method of removing free water adhering to the outer surfaces of fresh whole fruit while passing said fruit transversely across a series of substantially cylindrical parallel brushes which comprises the steps of: delivering the fruit to the valleys between adjacent brushes; rotating said brushes in a common direction to subject the fruit to a rapid brushing while in rolling contact with said brushes; establishing and maintaining a body of substantially still air beneath and in contact with the lower faces of said brushes; and heating said air to substantially raise the temperatures of the bristles and the air in the inter-bristle spaces of said brushes.

2. The method of removing free water adhering to the outer surfaces of fresh whole fruit while passing said fruit transversely across a series of substantially cylindrical parallel brushes which comprises the steps of: delivering the fruit to the valleys between adjacent brushes; rotating said brushes in a common direction to subject the fruit to a rapid brushing while in rolling contact with said brushes; establishing and maintaining a body of substantially still air beneath and in contact with the lower faces of said brushes; heating said air to substantially raise the temperatures in the inter-bristle spaces of said brushes; and mechanically dispersing into said body of still, hot air fine droplets of water gathering at the ends of said bristles by flexing said bristles and then allowing them to spring back by reflex action to their normal positions.

3. The method of removing free water adhering to the outer surfaces of fresh whole fruit while passing said fruit transversely across a series of substantially cylindrical parallel brushes which comprises the steps of: delivering the fruit to the valleys between adjacent brushes; rotating said brushes in a common direction to subject the fruit to a rapid brushing while in rolling contact with said brushes; flexing the bristles of said brushes to temporarily increase the inter-bristle interstices of said brushes; and directing quantities of hot air into said temporarily increased interstices.

4. In a mechanism for removing liquid from a cylindrical brush, the combination of: means for supporting and rotating said brush; and a bar disposed parallel with said brush, said bar having a relatively flat surface which gradually extends into the pathway followed by tips of the bristles of said brush, thereby momentarily retarding the rotational movement of said bristle tips, said surface having a sudden break at its inner extremity so as to release said bristles quickly at the point of their maximum restraint.

5. In a mechanism for removing liquid from a cylindrical brush, the combination of: means for supporting and rotating said brush; and a bar rectangular in cross section and disposed parallel with said brush, one of the flat surfaces of said bar gradually extending into the pathway followed by tips of the bristles of said brush, thereby momentarily retarding the rotational movement of said bristle tips, the inner edge of said surface releasing said bristles quickly at the point of their maximum restraint.

6. In an apparatus for removing free water adhering to the outer surfaces of fresh, whole fruit the combination of: a series of substantially cylindrical, parallel brushes disposed transversely to the path of travel of said fruit; means for momentarily retarding and then permitting the acceleration of the peripheral portions of the bristles of said brushes as said bristles revolve with said brushes, thereby causing particles of moisture to be thrown off from said brushes into the surrounding atmosphere; and flexible drape means hanging downwardly over said brushes to intercept such particles of water as might tend to be thrown from said brushes in the direction of the travel of fruit through said apparatus.

7. The method of removing free water adhering to the outer surfaces of fresh whole fruit while passing said fruit across a series of parallel rotary brushes which comprises: delivering the fruit to the valleys between adjacent brushes; rotating said brushes in a common direction to subject the fruit to a rapid brushing while in rolling contact with said brushes; flexing the bristles of certain of said brushes to form a gap in the brush bristles in advance of the bristles so flexed; directing quantities of hot air into said gaps in said brush bristles in order to heat said bristles and accelerate evaporation therefrom; and releasing the flexed bristles suddenly to cause the reflexing of said bristles to their normal positions to throw downwardly therefrom drops of water formerly adhering to said bristles.

8. A process of removing free moisture from the exterior surfaces of fresh whole fruit which comprises vigorously brushing said fruit while subjecting it to the action of heated air currents propelled over the fruit under the influence of and at the rate produced by the convections currents resutling from the elevated temperature of said air.

9. The method of removing free water adhering to the outer surfaces of fresh whole fruit while supporting said fruit by means of and passing said fruit transversely across a series of substantially cylindrical parallel brushes, which comprises delivering the fruit to the valleys between adjacent brushes; rotating said brushes in a common direction to subject the fruit to a brushing action when in rolling contact with said brushes; constantly maintaining at substantially atmospheric pressure a confined body of heated air beneath and in contact with the lower faces of said brushes, and conducting heated air from said body into contact with supported surfaces of substantially the entire body of fruit from beneath the brushes in a rising flow gently and uniformly through the entire underlying area of the brushes, and discharging said air directly into the unconfined atmosphere above asid brushes.

10. The method of removing free water adhering to the outer surfaces of fresh whole fruit while supporting said fruit by means of and passing said fruit transversely across a series of substantially cylindrical parallel brushes, the space above said brushes being directly open to the atmosphere and the space below said brushes being substantially confined; which method comprises delivering the fruit to the valleys between adjacent brushes; rotating said brushes in a common direction to subject the fruit to a brushing action while in rolling contact with said brushes; constantly supplying and maintaining heated air at substantially atmospheric pressure in said confined space, and passing said air upwardly into contact with the supported surfaces of substantially the entire body of fruit from beneath said brushes and substantially immediately disseminating said air into the atmosphere above the brushes without again contacting therewith or with said fruit.

HALE PAXTON.
GERALD C. PAXTON.